United States Patent
Tomlinson, III et al.

[11] 3,814,498
[45] June 4, 1974

[54] INTEGRATED OPTICAL CIRCUIT DEVICES EMPLOYING OPTICAL GRATINGS

[75] Inventors: Walter John Tomlinson, III, Holmdel; Heinz Paul Weber, Middletown, both of N.J.

[73] Assignee: Bell Telephone Labs, Murray Hill, N.J.

[22] Filed: Dec. 18, 1972

[21] Appl. No.: 316,096

Related U.S. Application Data

[63] Continuation-in-part of Ser. No. 250,158, May 4, 1972, abandoned.

[52] U.S. Cl............................. 350/96 WG, 350/162 R
[51] Int. Cl............................. G02b 5/14, G02b 5/18
[58] Field of Search.................... 350/96 WG, 162 R

[56] References Cited
UNITED STATES PATENTS
3,617,109  11/1971  Tien .............. 350/96 WG
3,674,336  7/1972  Kogelnik ............ 350/96 WG

OTHER PUBLICATIONS

K. S. Pennington et al., Holographic Techniques for Fabrication of Optical Waveguide Networks, IBM Technical Disclosure Bulletin, Vol. 14, No. 5, Oct. 1971.

*Primary Examiner*—John K. Corbin
*Attorney, Agent, or Firm*—Wilford L. Wisner

[57] ABSTRACT

There are disclosed a variety of new integrated devices for use at optical frequencies. Each of the devices comprises a body, either in the form of a cladded fiber or a thin-film dielectric waveguide, consisting of a low optical loss material suitable for guiding a beam of light and including an optical grating formed in the body so as to affect the propagation of the guided beam. By properly selecting the period, amplitude of modulation, angle and length of the grating, there are realized wavelength selective beamsplitters and beam combiners, broadband reflectors, and a variety of filters. Fabrication techniques and materials are also disclosed.

10 Claims, 8 Drawing Figures

FIG. IA
SIDE VIEW $n_f > n_s > n_0$

FIG. 4
SIDE VIEW

A — LOWPASS FILTER (BACKWARD SCATTERING)

$\lambda_1 = \Lambda(N + n_s)$

BRAGG REFLECTION

B — HIGHPASS FILTER (FORWARD SCATTERING)

$\lambda_2 = \Lambda(N - n_s)$

C — BANDPASS FILTER

INTEGRATED OPTICAL CIRCUIT DEVICES EMPLOYING OPTICAL GRATINGS

CROSS REFERENCE TO RELATED APPLICATION

This application is a continuation-in-part of my co-pending application, Ser. No. 250,158, filed May 4, 1972, now abandoned.

BACKGROUND OF THE INVENTION

This invention relates to integrated optical circuit devices and, more particularly, to thin-film and fiber optical circuit devices employing grating structures.

A variety of thin-film and fiber dielectric waveguiding structures have recently become available for guiding electromagnetic wave energy in the infrared, visible and ultraviolet portions of the frequency spectrum, collectively designated as the optical region. Such structures, which may take any of a large number of forms, have become known in the art generally as integrated optical waveguides or circuits. Due to their relatively small size, rugged and reproducible construction, and low cost, there is now a considerable interest in the use of such structures for the transmission of information-carrying light beams in high capacity optical communication systems.

An article by S. E. Miller in the *IEEE Journal of Quantum Electronics*, Volume QE-8, at page 199 (February, 1972) provides a thorough survey of the development and present state of the art of integrated optics and its relation to optical communications. In the article, it is noted that, in order for optical communication systems to compete successfully with lower frequency systems, a variety of integrated optical circuit devices must be devised which are analogous to the various components of lower frequencies systems, and which are, at the same time, consistent with the integrated circuit structure.

Optical gratings with fixed periodicities have been utilized to form a number of such integrated circuit devices. Optical components such as light beam couplers, decouplers, monochromatic beamsplitters and reflectors, and distributed feedback resonators have been previously made using gratings. The gratings are typically formed in the waveguide structure by periodic modulations or variations in a transmission characteristic, i.e., refractive index, absorption constant, or thickness, in a region of the guide material itself. As a consequence, the gratings conform with the circuit structure and the devices have the advantages of simplicity, ruggedness and lack of bulk.

Despite the obvious compatibility of the fixed optical gratings with integrated optical circuit arrangements, the grating devices presently known and used in the art are generally quite limited in function. This deficiency is partly due to the fact that the scattering response of a typical grating is sharply peaked in wavelength and in angle so that matching of the grating characteristics to the wavelength and orientation of an incident beam to be scattered is a problem. It is also partly due to the lack of a sufficient variety of simple, adaptable and inexpensive techniques for fabricating such devices with the required manufacturing tolerances and to the lack of sufficient knowledge as to how to adapt a given fabrication technique to a variety of devices and uses.

SUMMARY OF THE INVENTION

We have recognized that a variety of new integrated optical circuit devices can be devised which make use of optical gratings with selected periodicities and which can be simply and economically fabricated in large numbers by techniques now available in the art. We have found that by properly selecting the various grating parameters in thin-film or fiber optical waveguides, such as, for example, the grating period, length (number of grating periods), amplitude of modulation (peak-to-peak variation of the transmission characteristic over a grating period) and the like, or a suitable pattern of variation of such parameters, there can be realized wavelength-selective beam-splitters abd beam combiners, broadband reflectors, and a variety of filters. Each of the devices, because of its simplicity, ruggedness, lack of bulk and low cost, is completely consistent with existing integrated circuit structures. Each of the devices can be used to perform important functions in optical communication systems or to serve as building blocks for more sophisticated integrated optical devices.

Specifically, in a first illustrative embodiment of our invention, a thin-film beamsplitter is described which can serve to separate spatially the various wavelength components in a frequency multiplexed optical communication system. An optical grating is formed in the thin guiding film as a periodic variation in the refractive index of the film or in the film thickness, with the grating lines, that is, the lines of equal refractive index or the lines of equal film thickness, inclined at an angle with respect to the propagation direction of the guided beam. The grating parameters are chosen so that the grating deflects the incident guided beam into a guided mode of different direction. It is provided with a broadened wavelength scattering response that varies along the propagation direction of the beam so that the shorter wavelengths are separated from the beam first and longer wavelength components initially passed by the grating. The varying response is provided according to our invention either by tapering the spacing between the grating lines, commonly referred to as the grating period, or alternatively, by having the grating period constant and tapering the film thickness along the direction of the beam. The device can be converted to a beam combiner or multiplexer simply by operating the device in a reverse manner.

In another embodiment of our invention, a thinfilm boradband reflector is described which employs a grating with a broadened and tapered wavelength scattering response similar to that of the foregoing embodiment, but with grating lines oriented to be orthogonal to the propagation direction of the guided beam. The grating parameters are chosen so that the grating reflects the incident wave energy into a guided mode propagating in a reverse or backward direction in the film. The successive reflections from various portions of the grating yield a broadband reflection of the beam.

In still another embodiment of our invention, various filter arrangements are described employing optical gratings. By properly selecting the grating period in relation to the relative refractive index values in a thin-film wave guiding structure, both lowpass and highpass filters are realized. Bandpass filters are also described comprising a combination of the lowpass and highpass filters.

Although each of the foregoing illustrative devices are described below in terms of the thin-film dielectric waveguides, the devices are readily modifiable for use in cladded fiber dielectric waveguides.

Furthermore, many replicas of each of the foregoing devices can be simply and inexpensively fabricated with the required tolerances by using the embossing techniques disclosed in our copending application with E. A. Chandross and R. Ulrich, Ser. No. 189,101 filed Oct. 14, 1971, now U.S. Pat. No. 3,767,445, or alternatively, by using the casting and printing techniques disclosed in our copending application with E. A. Chandross, Ser. No. 250,157, filed May 4, 1972, both of which are assigned to the assignee hereof.

BRIEF DESCRIPTION OF THE DRAWING

A more complete understanding of the foregoing and other features and advantages of our invention can be obtained from the following detailed description taken in conjunction with the accompanying drawing in which.

DETAILED DESCRIPTION OF THE ILLUSTRATIVE EMBODIMENTS

1. Theoretical Background

Before proceeding with a thorough description of the various optical circuit devices embodied according to our invention, a general theoretical investigation is warranted of the effects that optical gratings have upon guided beams propagating in thin-film dielectric waveguides. In the investigation, we frequently make use of a coupled wave theory of thick holographic optical gratings as described by H. W. Kogelnik in Volume 48 of the *Bell System Technical Journal* at page 2909 (November, 1969). Although Kogelnik's theory is not strictly valid for all of the cases which we consider, we make modifications and approximations in the theory whenever appropriate to obtain a reasonable representation of the effects in each case.

Figure 1A:
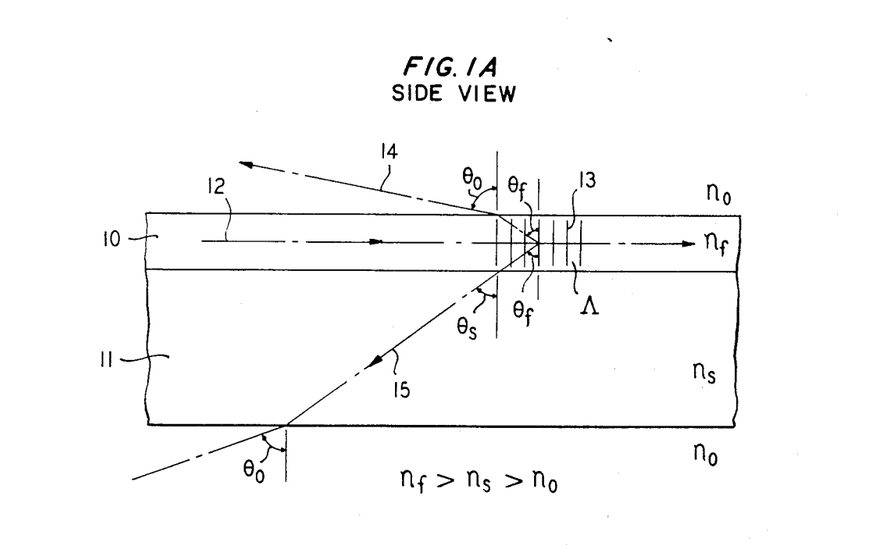
FIGS. 1A and 1B are pictorial illustrations useful in understanding important features of our invention, FIG. 1A being a side view of a section of an optical waveguide including an optical grating, FIG. 1B being a top view of a section of an optical waveguide including an optical grating.

FIG. 1A shows, greatly enlarged, a pictorial illustration of a side view section of a thin-film dielectric waveguide comprising thin-film 10 of a low optical loss transparent material, having an optical index of refraction $n_f$, and deposited on substrate 11 with a lower index of refraction $n_s$. The index $n_s$ is typically less than the index $n_f$ by one percent or more. An optical beam of radiation 12 with a free space wavelength $\lambda_o$ propagates along the plane of film 10 in a guided mode therein with a wavelength $\lambda_f = \lambda_o/N$ where N is the effective refractive index of film 10 and $n_s < N < n_f$. An optical grating 13, shown as a series of vertical lines in the illustrated section of film 10, consists of either a spatially periodic or near periodic modulation in the refractive index $n_f$ of film 10, or alternatively, a spatially periodic or near periodic modulation of the film thickness. It is assumed that the periodic modulations have substantial spatial extent into the plane of the paper. The vertical grating lines therefore represent the regions of equal refractive index in the film or the regions of equal film thickness. Either arrangement results in a spatial modulation of N, the effective film index, and has essentially the same effect on guided beam 12.

As the guided wave 12 encounters grating 13 at normal incidence, a portion of the incident wave energy is scattered out of the plane of film 10 at an angle given by the applicable grating equation. To simplify our investigation, we treat film 10 as if it were many optical wavelengths thick. The grating equation for such a case can then be written as $$\sin \theta_f = 1/n_f \, (\lambda_o/\Lambda - N) \qquad 1.$$

where $\theta_f$ is the scattering angle measured with respect to the grating lines, which in this case are perpendicular to the propagation direction of beam 12, $\theta$ is the grating spacing or period, and the other terms are as defined hereinabove.

For a selected period value $\Lambda$, waves 14 and 15 can be scattered out of thin-film 10 by grating 13 as depicted in FIG. 1A, and their orientations in substrate 11 or in the surrounding air can be determined by applying Snell's law at the respective film-substrate, film-air and substrate-air interfaces. As the grating period $\Lambda$ decreases from this value, the angle $\theta_o$, measured with respect to the normal to the air interfaces, increases until it reaches 90° at $\Lambda = \lambda_o/(N + 1)$. For further decreases in $\Lambda$, scattered waves 14 and 15 will be totally internally reflected at the air interfaces (the latter wave at the lower of such interfaces), and thus trapped in substrate propagation modes. As $\Lambda$ approaches $\lambda_o/(N + n_s)$, the angle $\theta_s$, measured normal to the substrate-film interface, approaches 90°. For additional decreases in $\Lambda$, there is no scattering by grating 13 and the beam propagates unaffected thereby, except for the discrete conditions $\Lambda = \lambda_o/(N + N_i)$, where $N_i$ is the effective refractive index of film 10 for the $i^{th}$ transverse order mode of the film. For the latter case, scattered wave 15 will be trapped in film 10 and will propagate in the $i^{th}$ mode thereof in a backward direction.

For films with thicknesses of the order of or less than the optical wavelength (as is usually the case in integrated optical arrangements), the foregoing treatment is not strictly valid, but the foregoing results are in good theoretical and experimental agreement with more rigorous approaches. For an example of a detailed perturbation theory of thin slab waveguides, see D. Marcuse's paper in Volume 48 of the *Bell System Technical Journal*, at page 3233, (December 1969) and his earlier papers referenced therein.

Figure 1B:
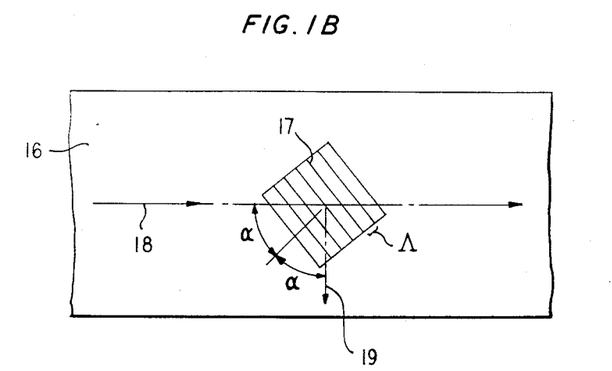

If the grating lines are not perpendicular to the propagation direction of the guiding beam, there will also be a deflection of a portion of the incident wave energy in the plane of the film and in the direction of the grating lines. FIG. 1B illustrates a pictorial top view taken normal to the plane of film 16 of a section of a thin-film dielectric waveguide. Optical grating 17 is formed on a surface of film 16 with grating lines inclined at an angle $\alpha$ with respect to the propagation direction of guided beam 18. In this case, the calculation of the propagation direction of scattered wave 19 involves three-dimensional geometry but the physical phenomena are substantially the same as in the case of normal incidence. When the grating period $\Lambda$ of grating 17 is small enough that the scattered light is trapped in film 16, its propagation direction in the film corresponds to that of specular reflection from the grating lines. Accordingly, light incident at an angle $\alpha$ to the normal to grating will be scattered into a guided wave at an angle $-\alpha$ if the grating period $\Lambda = \lambda_0/(2N \cos \alpha)$. Gratings with periods smaller than this value have no effect on the incident guided beam 18.

The scattering efficiencies and other characteristics of the devices of FIGS. 1A and 1B can be estimated and optimized in any particular propagation mode by adjusting the various grating parameters in view of the equations of Kogelnik's theory of thick holographic gratings referred to hereinabove. The optimum arrangement of parameters is best determined experimentally in each particular case. Thus, by properly selecting the grating period, the length of the grating (the number of grating periods), the relative refractive index values of film and substrate, the amplitude of the grating modulation, and the like, grating 13 in FIG. 1A can be designed to scatter substantially all of the incident guided beam 12 into a mode propagating out of the plane of film 10; and likewise grating 17 in FIG. 1B can be designed to deflect substantially all of beam 18 into guided beam 19. For the scattering of a beam propagating in a particular mode into the same mode but in a different direction, the Bragg condition at the gratings in the foregoing devices is satisfied and the scattering processes can be made to approach 100 percent efficiency. To achieve such high efficiencies, gratings 13 and 17 are typically many periods in overall length. Such gratings exhibit responses that are typically sharply peaked both in wavelength and in angle.

As indicated hereinabove, some applications of the above principles have been reported previously in the form of thin-film light beam couplers and of monochromatic beamsplitters. See, for example, Volume 3 of *Optics Communications*, at page 357 (July, 1971). As an example of prior art use of optical gratings, consider the device of FIG. 1B as a right angle beamsplitter for a monochromatic guided beam. Such a device requires a grating with a period $\Lambda = \lambda_0/\sqrt{2}N$) oriented with grating lines at $\alpha = 45°$ to the propagation direction of incident guided beam 18. Using Kogelnik's theory with illustrative numerical values, calculations shown that such a right angle beamsplitter with a scattering efficiency of 50 percent operating at $\lambda_0 = 0.633$ microns, and with a grating having an effective amplitude of index modulation of $10^{-3}$, requires an overall grating length orthogonal to the lines of constant index of about 100 microns. The grating has an angular response of about $10^{-3}$ radians and a wavelength response about $10^{-2}$ microns. A larger index modulation will reduce the required length of the grating and increase the width of the grating response. The extent to which the response of the grating can be broadened by such means is nevertheless limited.

Taking account of the foregoing principles, we have recognized that the following new integrated optical circuit devices employing optical grating structures can be constructed to serve important functions in integrated optical communication systems or to serve as important building blocks for more sophisticated integrated optical devices.

2. Wavelength-Selective Beamsplitter

Figure 2A:
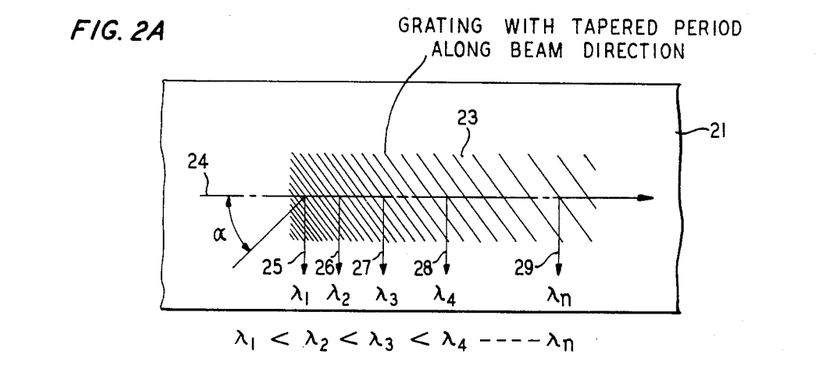
FIGS. 2A and 2B show first illustrative embodiments of our invention as a wavelength-selective beamsplitters or channel dropping filters.

FIG. 2A illustrates a top view of a wavelength selective beamsplitter embodied according to our invention which may serve to separate spatially the various wavelength components in a frequency-multiplexed signal in thin-film optical apparatuses. The basic principles underlying the operation of the device are that the response of a conventional optical grating is typically sharply peaked, both in wavelength and in angle, and that an optical grating will not affect a beam whose wavelength is too long to satisfy the Bragg condition, i.e., $\Lambda = \lambda_0/(2N \cos \alpha)$.

The fabrication in a sufficient variety of optical materials of gratings which have periods of the order of $\lambda_0$ (2N $\cos \alpha$) and which are at the same time many periods in overall length was not feasible in the prior art. With the recent discoveries of the various fabrication techniques mentioned hereinbelow in section 5 of this description, it has become feasible to consider the mass production of a variety of optical devices employing such gratings.

Illustratively, the device of FIG. 2A comprises low loss, optically guiding thin-film 21 deposited on a lower refractive index substrate (not shown). Formed on the surface of film 1 is optical grating 23 with grating lines inclined at an angle $\alpha = 45°$ to the propagation direction of guided beam 24. Beam 24 is a multiwavelength beam, preferably with a defined range of wavelength components $\lambda_1$ through $\lambda_n$. Grating 23 has a broadened wavelength response that varies along the direction of propagation of beam 24. Such a spatially varying response is accomplished according to our invention by a number of alternative techniques. For the illustrated case of FIG. 2A, the spatially varying response of grating 23 is provided by tapering the grating period along the direction of propagation of beam 24. The taper in the period is arranged so that the shortest wavelength component $\lambda_1$ is scattered first by grating 23, illustratively into a guided mode in the film, and the longer wavelength components $\lambda_2 \ldots \lambda_n$ are initially passed unaffected by grating 23. Therefore, the period of grating 23 in FIG. 2A illustratively varies along the path of beam 24 from an initial value of $\Lambda_1 = \lambda_1/(\sqrt{2} N)$ progressively up to a final value of $\Lambda_n = \lambda_n/(\sqrt{2} N)$. The scattering by grating 23 then results in a group of spatially separated, parallel-propagating, single wavelength guided beams 25 through 29 which may be extracted for utilization in appropriate optical devices (not shown). If each beam had been independently modulated and then transmitted together as multiplexed beam 24 then the device of FIG. 2A is a channel-dropping filter.

Figure 2B:
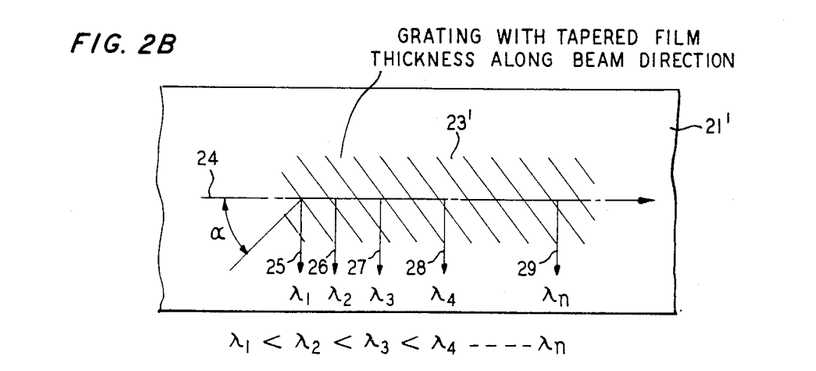

An alternative technique for providing the spatially varying grating scattering response is explained with the aid of FIG. 2B of the drawing. The elements of FIG. 2B that are numbered the same as the elements of FIG. 2A are identical thereto. The key differences are in film 21' and grating 23'. The spatially varying response in the device of FIG. 2B is provided by having the grating period constant in grating 23' and by tapering the thickness of film 21' in the region of grating 23' along the propagation direction of beam 24. This provides a range of progressively increasing values of the effective index N of film 21'. Illustratively, the grating period in grating 23' is $\Lambda = \lambda_1/(\sqrt{2} N)$. By increasing the film thickness along the direction of beam 24, the effective index of film 21' can be varied from its untapered value of N progressively up to a final value of $N_n = \lambda_n/(\sqrt{2} \Lambda)$. The device of FIG. 2B then operates in the same manner as that of FIG. 2A.

The taper in the above devices, whether it be the grating period or in the film thickness, is not necessarily linear. For example, to separate two spaced, narrow subbands from the guided beam, the period of thickness would be linearly increased from a first value to scatter the wavelengths in the first subband, then increased in the manner of a step function to a second value from which it is again linearly increased to scatter the wavelengths in the second subband. The precise taper in each case depends upon the desired wavelengths or bands of wavelengths to be separated and upon the desired positions along the beam direction at which they are separated.

It should also be possible to provide the spatially varying wavelength response in a device of the type shown in FIG. 2A and 2B by curving the grating lines in the grating along the path of the guided beam so as to provide a range of grating orientations with respect to the beam. Thus, by maintaining the film thickness and grating period at constant values, a preselected variation in the angle $\alpha$ in accordance with the equation $\Lambda = \lambda_n/(2N \cos \alpha_n)$ along the path of beam 24 can be employed selectively to split the various wavelength components of the beam in substantially the same manner as described for FIG. 2A and 2B hereinabove. This latter technique would appear to require the most strict tolerances during fabrication. Nevertheless, the fabrication techniques described hereinbelow, especially the casting and printing techniques, would probably be feasible for such a device.

Slight increases in the period values above $\Lambda_1, \ldots \Lambda_n$ in the embodiments of FIG. 2A and 2B can be used to couple the wavelength components out of film 21 or 21' and into the substrate rather than to deflect them into guided modes in the film. Likewise, the scattering efficiency of the beamsplitter for each wavelength component can be conveniently adjusted to within desired values by controlling the various grating parameters, such as, for example, the length of the grating, the amplitude of the grating modulation and/or the relative value of the refractive indices in the device.

Furthermore, while we have here considered, by way of example, the case of a beamsplitter or optical beam demultiplexer, it should now be apparent to those skilled in the art that the devices of FIG. 2A and 2B are completely reversible in operation. Hence, for oppositely directed waves, the devices can be used as beam combiners or optical beam multiplexers.

3. Broadband Reflector

Figure 3:
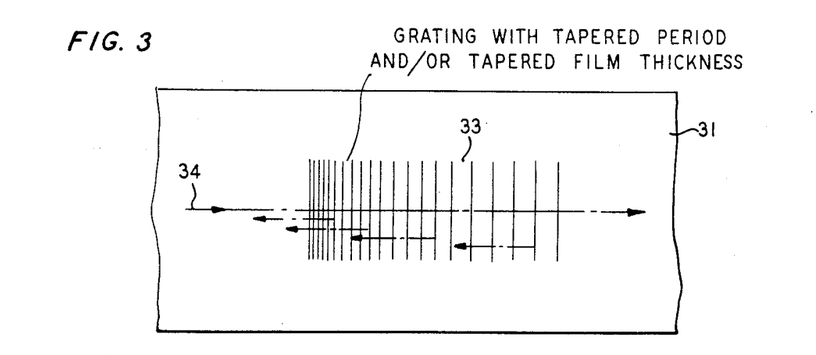
FIG. 3 shows another illustrative embodiment of our invention as a broadband reflector.

FIG. 3 illustrates a top view of a broadband reflector embodied according to our invention which utilizes the same basic principles as those described hereinabove for the wavelength selective beamsplitter. The fabrication of broadband reflectors suitable for use in integrated optical arrangements has presented a persistent problem to workers in the art. Despite the lack of practical proposals for such devices, the need for them in various optical systems is clear. For example, with the advent of thin-film lasers employing laser media capable of emitting a broad range of laser wavelengths, e.g., dye laser media, broadband reflectors are required to form a resonator for the wavelengths, as desired to provide a suitable tuning range or mode-locked pulsing. Moreover, for laser media in which a very narrow laser transition is present, it is extremely difficult to match the narrowband response of the conventional grating to the transition in order to form a suitable resonator. Broadband grating reflectors would solve this problem.

In FIG. 3 an optical grating 33 is illustratively formed on a surface of thin guiding film 31. The grating lines of grating 33 are oriented normal to the direction of incidence of multiwavelength guided beam 34. A broadened, spatially varying wavelength response in grating 33 is provided by tapering the period of the grating as in FIG. 2A above or by tapering the thickness of film 31 in the region of the grating along the propagation direction of beam 34 as in FIG. 2B. The period values are illustratively adjusted so that the various wavelengths of beam 34 are scattered by the grating into guided modes propagating in a backward direction in film 31. As in the beamsplitter described hereinabove, the period values or film thicknesses are increased along the path of beam 34 so that the shortest wavelengths are scattered or reflected first, and the longer wavelengths are initially passed by the grating. Multiple reflections from the successively deeper regions of grating 33 gives rise to a broadband reflection of beam 34.

The device of FIG. 3 can be fabricated to reflect the entire band of multiwavelength guided beam 34 or some predetermined subband thereof. Its reflectivity can be adjusted by controlling the length of grating 33, by varying the amplitude of the grating modulation, and/or by varying the relative index values. It will also be noted that the device of FIG. 3 gives rise to a phase shift in the reflected beam which varies with wavelength, due to the multiple reflections from successive regions of grating 33. This phase shift, although possibly troublesome in some arrangements, will present no problems for numerous applications of the device.

4. Filters

We have also recognized the possibility of fabricating a variety of thin-film or fiber-type filters using optical grating structures. In the transmitting range of the filters, the transmission is nearly 100 percent, while outside the range it can be made to be close to 0 percent. Both lowpass filters, which pass frequencies lower than the cutoff frequency or wavelengths longer than the cutoff wavelength, and highpass filters, which pass frequencies higher than the cutoff frequencies or wavelengths shorter than the cutoff wavelength, can be fabricated. By appropriately combining a lowpass filter and a highpass filter in the same integrated optical device, a bandpass filter can also be made. The availability of such filters makes it feasible to consider the performance of numerous narrowband frequency multiplexing operations in integrated optical communication systems. They are particularly attractive for integrated optics because the gratings can be made a structurally integral part of the fiber or thinfilm waveguide itself.

Figure 4:
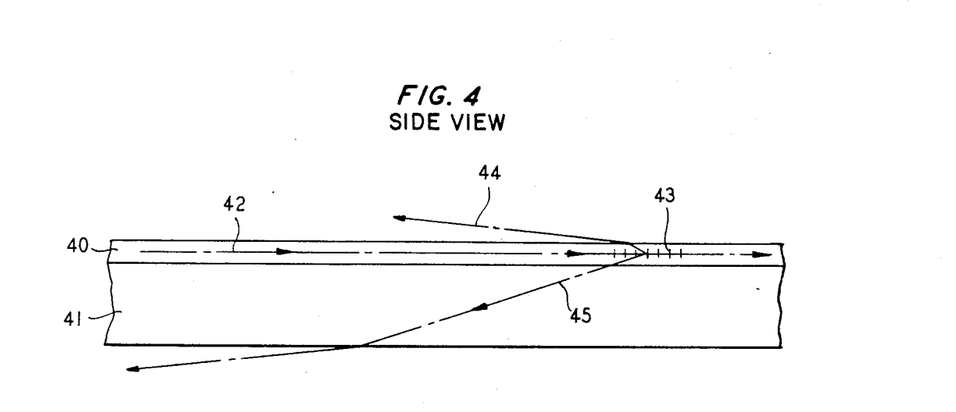
FIG. 4 shows a side view of still another embodiment of our invention as a thin-film filter.

Consider the thin-film dielectric waveguiding device illustrated as a side view section in FIG. 4 of the drawing which comprises thin film 40 of index $n_f$ deposited on substrate 41 of lower index $n_s$. The thickness of film 40 is chosen such that for the wavelengths of beam 42 only one mode of either polarization is guided in the film. We investigate how beam 42 is scattered out of film 40 by the spatially periodic modulation of the effective film index N provided by grating 43. To do this, we examine the diagram of FIG. 5 which is a $k$-vector representation of the propagating waves of FIG. 4 written in units of the magnitude of the free space $k$-vector, $k = 2\pi/\lambda_o$. The designations $\bar{k}_f$, $\bar{k}_o$, and $\bar{k}_s$ are the $k$-vectors for guided beam 42 propagating in film 40, scattered beam 44 propagating in the surrounding air of index $n_o$, and scattered beam 45 propagating in substrate 41, respectively. The modulation introduced by grating 43 is represented by the vector $\Delta\bar{k}/k$, the magnitude of which is equal to $\lambda_o/\Lambda$ where $\lambda_o$ is a free space wavelength in the wavelength range of beam 42 and $\Lambda$ is the grating period.

Figure 5:
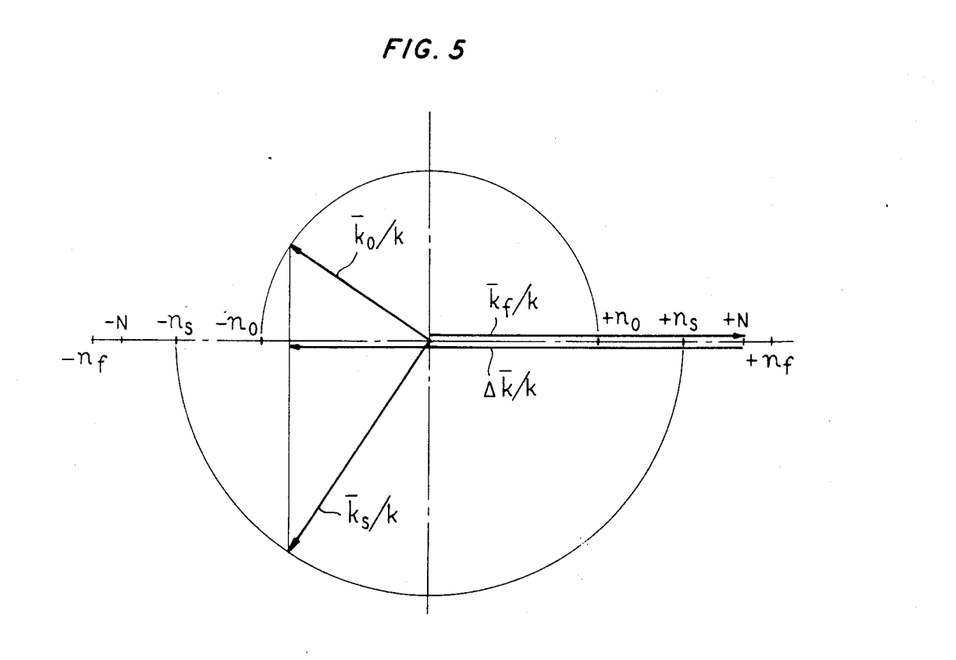
FIG. 5 is a $k$-vector representation of the incident and scattered waves from the optical grating illustrated in FIG. 4 above, included for purposes of explanation.

The general case of FIG. 4 is illustrated in the diagram of FIG. 5. It can be seen that there is a continuum of solutions for various magnitudes of $\Delta\bar{k}/k$ between $-n_s$ and $+n_s$ in the drawing. Outside this range there are only two discrete solutions, i.e., $-N$, corresponding to backward Bragg scattering, and $+N$, corresponding to the trivial solution of no grating. Two special cases are of interest:

a. The end of grating arrow $\Delta\bar{k}/k$ ends near $-n_s$

Figure 6:
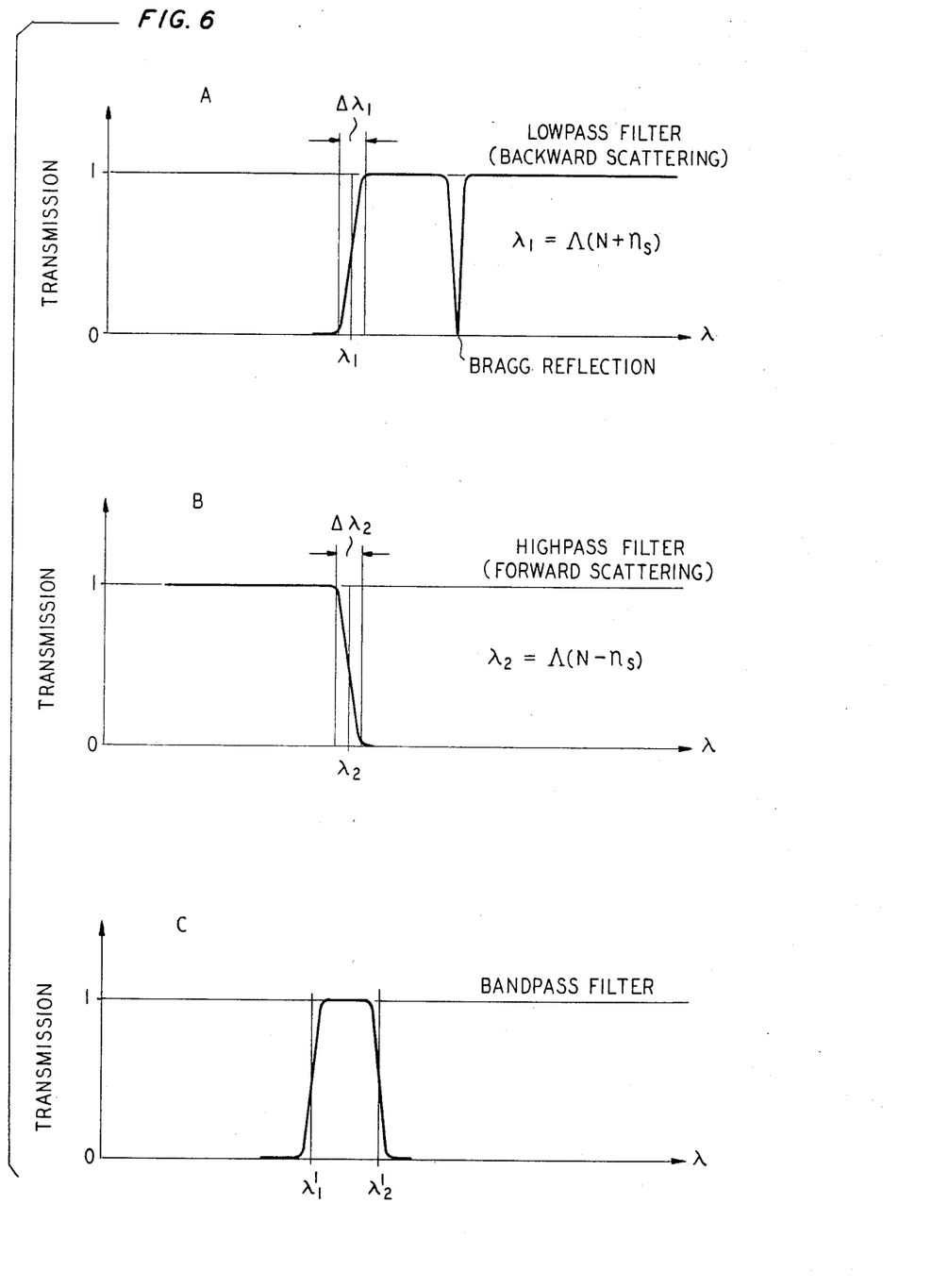
FIGS. 6A through 6C show the transmission characteristics for the lowpass, highpass and bandpass filters, respectively, embodied according to our invention.

For $\Delta k/k$ is greater than $(N + n_s)$, there exist no solutions in the diagram of FIG. 5, except for $\Delta k/k = 2N$, corresponding to the above-mentioned case of backward Bragg scattering, which we disregard here. Thus there is no scattering by grating 43 and the wavelengths of beam 42 pass unattenuated thereby. For $\Delta k/k$ smaller than $(N + n_s)$, there exist solutions and light is scattered out of film 10 into beams 44 and 45 of FIG. 4, generally in a backward direction. The latter case corresponds to a lowpass filter, the transmission characteristic of which is illustrated in FIG. 6A. The cutoff wavelength $\lambda_1$ is equal to $\Lambda(N + n_s)$, where $\Lambda$ is again the grating period. All wavelengths in beam 42 longer than $\lambda_1$ are passed unaffected by grating 43 (except for the limited wavelength range corresponding to the Bragg reflection), whereas wavelengths shorter than $\lambda_1$ are scattered out of film 40 by grating 43. The efficiency of this scattering process can be made to approach 100 percent, with a sufficient length of grating, i.e., number of periods. Hence, the transmission of the filter or wavelengths shorter than $\lambda_1$ is nearly 0 percent. The sharpness of the cutoff $\Delta\lambda_1$ and the length of the grating required can be estimated using the various equations of Kogelnik's thick holographic grating theory. For an index modulation in grating 43 of amplitude $\Delta n$, the required length of grating 43 is of the order of $\lambda_1/\Delta n$, and the resolution of the grating $\Delta\lambda_1/\lambda_1$ is of the order of $\Delta n/N$. High resolution in the lowpass filter is therefore obtainable by having a small amplitude value of index modulation.

b. The end of grating arrow $\Delta\bar{k}/k$ ends near $+n_s$

For $\Delta k/k$ smaller than $(N - n_s)$, there exists no scattering by grating 43 and beam 42 propagates therethrough unattenuated. For $\Delta k/k$ greater than $(N - n_s)$, there exist solutions for scattering, generally in the forward direction. This latter case corresponds to a highpass filter, the transmission characteristic of which is shown in FIG. 6B. In this case, the cutoff wavelength $\lambda_2 = \Lambda(N - n_s)$. All wavelengths in beam 42 longer than $\lambda_2$ are attenuated by grating 43, whereas wavelengths shorter than $\lambda_2$ are passed unaffected by the presence of the grating. Again the efficiency of the scattering can be made to approach 100 percent. The required length of grating 43 is still of of the order of $\lambda_2/\Delta n$, where $\Delta n$ is the amplitude of index modulation of grating 43, but the resolution $\Delta\lambda_2/\lambda_2$ is of the order $3N\Delta n/(N - n_s)^2$. Accordingly, high resolution in the highpass filter is obtainable by having a large value of $(N - n_s)$ and/or a small value of $\Delta n$.

The high resolution of these filters results from the coherent interaction between the incident and scattered waves over the entire length of the grating, thus film 40 and grating 43 must be kept flat and of uniform dimensions. The maximum usable length of grating 43 will therefore be limited by manufacturing tolerances. Given the maximum length practical under any circumstances, one can use the expressions given hereinabove for each of the filters to estimate the required index modulation and the resulting resolution. For example, for a grating length of 500 microns, the required $\Delta n$ is approximately $2 \times 10^{-4}$ which is easily obtainable by a number of fabrication techniques. A lowpass filter of this size operating at wavelengths in the order of 1 micron would have a resolution $\Delta\lambda_1/\lambda_1$ approximately equal to $10^{-4}$, while for a highpass filter with $(N - n_s) = 0.3$, the resolution $\Delta\lambda_2/\lambda_2$ will be approximately equal to $10^{-2}$.

A bandpass filter can be made simply by using both a lowpass filter and a highpass filter in series or by superimposing the two filters in the same region of film 40. It is only necessary to insure that the cutoff for the lowpass filter $\lambda_1$ is shorter than the cutoff for the highpass filter $\lambda_2$ by the width of the desired band. A typical transmission characteristic for a bandpass filter is depicted in FIG. 6C.

It has recently been pointed out that the generation of Raman or Brillouin scattering in thin-film or fiber type waveguiding materials in response to the propagation of guided beams may limit optical communication systems to low power levels. For the transmission of broadband signals, Raman scattering is the major limiting effect, and for a typical guide material such as quartz, the Stokes shift is $\Delta\lambda/\lambda$ approximately equal to $10^{-2}$. Accordingly, a highpass filter of the type described hereinabove could be used to introduce loss so as to overcome the Raman gain.

The lowloss fibers developed to date have very small values of $(N - n_s)$, where $N$ is the effective index of the guiding portion of the fiber and $n_s$ is the refractive index of the cladding material. A value of $(N - n_s)$ equal to 0.3 is much larger than would probably be used in present day fiber guides. Nevertheless, the filter section embodied according to our invention may be made sufficiently short in length, so that it can be inserted or formed at regularly spaced intervals along the communication link. Accordingly, it could be made of considerably higher loss materials to yield a value of $(N - n_s)$ in the order of 0.3 without introducing a significant overall loss in the system.

For the transmission of narrowband signals, where Brillouin scattering is the major limiting effect, the Stokes shift for quartz is $\Delta\lambda/\lambda$ approximately equal to $3 \times 10^{-5}$, which will be difficult to eliminate by our techniques, but not necessarily impossible.

It should be noted that the above considerations are valid for single mode waveguides. For multimode waveguides the situation becomes more complicated. The lowpass filter would appear to be still feasible; but the highpass filter for multimode waveguides may be unrealistic in the described form.

5. Fabrication Techniques

As indicated previously, fabrication of the foregoing devices can be accomplished using several techniques now available in the art. Both the embossing techniques of our U.S. Pat. No. 3,767,445 with E. A. Chandross and R. Ulrich, and the casting and printing techniques of our copending application with E. A. Chandross, referenced hereinabove, can be employed. Each of these techniques makes use of a die, the surface of which has a relief pattern corresponding to a high index-low index interface in the desired device. One or more transparent liquid dielectric films, preferably of liquid monomers with various values of refractive index, are disposed in contact with the dies to obtain the pattern thereof or on embossed low index substrates and then solidified, preferably by photochemical or thermal polymerization. The higher index regions then form the desired optical guide or part of the desired optical grating in the device.

The dies in each of the above-mentioned techniques can be made to be durable, e.g., of metal, so that a large number of replicas can be economically produced. The dies can also be fabricated to contain very high resolution relief images. The casting and printing techniques appear to be best suited for the fabrication of gratings with very strict tolerances. The high resolution and precision of these techniques accordingly insure that the tolerances set forth hereinabove for the disclosed guides and the gratings are satisfied during fabrication.

Typical starting materials in the above-mentioned techniques would include liquid monomers such as cyclohexyl methacrylate doped with suitable amounts of photosensitive or thermally activated polymerization initiators for the guide and plastic materials such as poly(methyl methacrylate) for the substrate in the devices. The cyclohexyl methacrylate, when polymerized, has a refractive index of 1.505, exceeding the index of the poly(methyl methacrylate) substrate ($n = 1.490$) by about one percent.

High resolution, low optical loss photoresist materials can also be employed in the fabrication of the devices of the foregoing type in which the gratings consist of periodic thickness variations. For devices in which the gratings consist of periodic refractive index variations, the photodielectric technique disclosed in U.S. Pat. No. 3,689,264, issued to E. A. Chandross, R. L. Fork, I. P. Kaminow and W. J. Tomlinson on Sept. 5, 1972, can also be employed. With this technique, well-defined regions of elevated index can be produced in suitably sensitized samples such as poly(methyl methacrylate) upon irradiation with focused ultraviolet light and subsequent aging.

The foregoing embodiments are merely illustrative of the basic principles of our invention. Numerous modifications and variations in the embodiments can be made by those skilled in the art without departing from the scope of our invention, as identified by the appended claims. For example, although each of the foregoing illustrative embodiments was described in terms of thin-film dielectric waveguides, it should be apparent that the devices can likewise be provided according to our invention in cladded fiber dielectric waveguides comprising high index guiding fibers surrounded by a layer of lower index cladding material. Periodic variations in the fiber diameter or refractive index will yield functional gratings. For the filters described hereinabove, one can use cladded fibers in which complete elimination of the scattered light by the grating is accomplished by absorption at the exterior wall of the cladding material.

We claim:

1. A wavelength selective beamsplitter for use in integrated optical apparatuses comprising means including an elongated body of a transparent dielectric material having a longitudinal axis and being capable of guiding along said axis within at least one dimension transverse thereto an optical beam of electromagnetic wave energy having a plurality of wavelength components, said body including an optical grating formed in a selected region thereof to affect the propagation of said guided beam, said grating having grating lines inclined at an angle with respect to the propagation direction of said guided beam in said body and a wavelength scattering response that spatially varies along said beam direction to scatter from said beam the shortest wavelength component to be separated at a first portion of said grating and to scatter from said beam the longer wavelength components to be separated at successive portions of said grating along said beam direction.

2. The device of claim 1 in which said body comprises a thin film having a thickness of the order of the wavelengths of the beam to be guided therein and an index of refraction $n_f$, said thin film being deposited on a transparent substrate having an index of refraction $n_s$ lower than $n_f$, and in which said grating has a period and an amplitude of modulation to scatter the wavelength components from said guided beam into spatially separated beams propagating in guided modes in said film and in directions different from said beam direction.

3. The device of claim 1 in which said body comprises a thin film having a thickness of the order of the wavelength of the beam to be guided therein and an index of refraction $n_f$, said thin film being deposited on a transparent substrate having an index of refraction $n_s$ lower than $n_f$, and in which said grating has a period and an amplitude of modulation to scatter the wavelength components from said guided beam into spatially separated beams propagating out of said film into said substrate.

4. The device of claim 1 in which the spatial variation in the wavelength scattering response of said grating is provided by tapering the value of the grating period along said beam direction.

5. The device of claim 4 in which the grating lines are inclined at angle $\alpha$ with respect to said beam direction and in which the grating period varies in said direction from an initial value of $\Lambda_1 = \lambda_1/(2N \cos \alpha)$ to a value of $\Lambda_n = \lambda_n/(2N \cos \alpha)$, where $\lambda_1$ and $\lambda_n$ are the shortest and longest wavelength components in said beam to be separated, respectively, and $N$ is the effective refractive index of said body.

6. The device of claim 1 in which the spatial variation in the wavelength scattering response of said grating is provided by tapering the magnitude of said transverse dimension of said body along said beam direction.

7. A broadband reflector for use in integrated optical apparatuses comprising means including an elongated body of a transparent dielectric material having a longitudinal axis and being capable of guiding along said axis within at least one dimension transverse thereto an optical beam of electromagnetic wave energy having a plurality of wavelength components, said body including an optical grating formed in a selected region thereof to affect the propagation of said guided beam, said grating having grating lines disposed orthogonal to the propagation direction of said guided beam in said body and a wavelength scattering response that spatially varies along said beam direction to scatter the shortest wavelength component of said beam to be reflected at a first portion of said grating into a guided mode propagating in a backward direction in said body and to scatter the longer wavelength components of said beam to be reflected at successive portions of said grating along said beam direction into said backwardly propagating guided mode.

8. The device of claim 7 in which the spatial variation in the wavelength scattering response is provided by tapering the value of the grating period along said beam direction.

9. The device of claim 8 in which the grating period varies in said beam direction from an initial value of $\Lambda_1 = \lambda_1/2N$ to a value of $\Lambda_n = \lambda_n/2N$ where $\lambda_1$ and $\lambda_n$ are the shortest and longest wavelength components to be reflected, respectively, and $N$ is the effective refractive index of said body.

10. The device of claim 7 in which the spatial variation in the wavelength scattering response of said grating is provided by tapering the magnitude of said transverse dimension of said body along said beam direction.

* * * * *